United States Patent
Kryukov et al.

(10) Patent No.: US 10,133,669 B2
(45) Date of Patent: Nov. 20, 2018

(54) SEQUENTIAL DATA WRITES TO INCREASE INVALID TO MODIFIED PROTOCOL OCCURRENCES IN A COMPUTING SYSTEM

(71) Applicant: INTEL CORPORATION, Santa Clara, CA (US)

(72) Inventors: Pavel I. Kryukov, Moscow (RU); Stanislav Shwartsman, Haifa (IL); Joseph Nuzman, Haifa (IL); Alexandr Titov, Severodvinsk (RU)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 15/352,272

(22) Filed: Nov. 15, 2016

(65) Prior Publication Data

US 2018/0137053 A1    May 17, 2018

(51) Int. Cl.
| | | |
|---|---|---|
| *G06F 12/08* | (2016.01) |
| *G06F 12/0808* | (2016.01) |
| *G06F 12/0811* | (2016.01) |
| *G06F 12/0837* | (2016.01) |
| *G06F 12/084* | (2016.01) |
| *G06F 12/0842* | (2016.01) |
| *G06F 12/0891* | (2016.01) |

(52) U.S. Cl.
CPC ........ *G06F 12/0808* (2013.01); *G06F 12/084* (2013.01); *G06F 12/0811* (2013.01); *G06F 12/0837* (2013.01); *G06F 12/0842* (2013.01); *G06F 12/0891* (2013.01); *G06F 2212/1016* (2013.01); *G06F 2212/6042* (2013.01)

(58) Field of Classification Search
CPC ............... G06F 12/084; G06F 12/0811; G06F 12/0842; G06F 12/0837; G06F 12/0808; G06F 12/0891
USPC ........................................................ 711/121
See application file for complete search history.

(56) References Cited

U.S. PATENT DOCUMENTS

| | | |
|---|---|---|
| 5,555,398 A | 9/1996 | Raman |
| 6,282,615 B1 | 8/2001 | Arimilli et al. |
| 6,338,116 B1 | 1/2002 | Arimilli et al. |
| 6,615,323 B1 | 9/2003 | Petersen et al. |
| 6,678,800 B1 | 1/2004 | Kurihara et al. |
| 6,807,590 B1 | 10/2004 | Carlson et al. |

(Continued)

FOREIGN PATENT DOCUMENTS

WO    2007/084484 A2    7/2007

OTHER PUBLICATIONS

International Search Report and Written Opinion dated Oct. 17, 2017, on application No. PCT/US2017/041251.

*Primary Examiner* — Jasmine Song
(74) *Attorney, Agent, or Firm* — Lowenstein Sandler LLP

(57) ABSTRACT

An example system on a chip (SoC) includes a cache, a processor, and a predictor circuit. The cache may store data. The processor may be coupled to the cache and store a first data set at a first location in the cache and receive a first request from an application to write a second data set to the cache. The predictor circuit may be coupled to the processor and determine that a second location where the second data set is to be written to in the cache is nonconsecutive to the first location, where the processor is to perform a request-for-ownership (RFO) operation for the second data set and write the second data set to the cache.

18 Claims, 12 Drawing Sheets

(56) References Cited

U.S. PATENT DOCUMENTS

| | | |
|---|---|---|
| 8,656,106 B2 | 2/2014 | Cox et al. |
| 2005/0071573 A1 | 3/2005 | Dodson et al. |
| 2006/0080398 A1 | 4/2006 | Hoover et al. |
| 2008/0320232 A1 | 12/2008 | Vishin et al. |
| 2009/0164735 A1 | 6/2009 | Nicholas et al. |
| 2009/0164736 A1 | 6/2009 | Dorsey et al. |
| 2010/0146217 A1 | 6/2010 | Pape |
| 2010/0228922 A1 | 9/2010 | Limaye |
| 2010/0269102 A1 | 10/2010 | Latorre et al. |
| 2010/0274972 A1 | 10/2010 | Babayan et al. |
| 2011/0231593 A1 | 9/2011 | Yasufuku et al. |
| 2012/0042133 A1 | 2/2012 | Takeda et al. |
| 2013/0282987 A1 | 10/2013 | Koob et al. |
| 2014/0040561 A1 | 2/2014 | Lih Iulin et al. |
| 2014/0101390 A1* | 4/2014 | Sohi ............... G06F 12/0815 711/144 |
| 2014/0297961 A1 | 10/2014 | Thottethodi et al. |
| 2015/0178199 A1 | 6/2015 | Wang et al. |
| 2015/0178206 A1 | 6/2015 | Chamberlain et al. |
| 2016/0162406 A1 | 6/2016 | Latorre et al. |
| 2016/0335177 A1 | 11/2016 | Huang et al. |

* cited by examiner

| FB# | Bytes Written | Wait For I2M | Action |
|---|---|---|---|
| 0 | 11111111...11111111 | False | Send I-to-M request |
| 1 | 11011111...11111111 | False | Send RFO Request |
| 2 | 11011111...11111111 | True | Nothing is Sent |
| 3 | 11111111...11111111 | True | Set Wait For I2M = False |

FIG. 5

SEQUENTIAL DATA WRITES TO INCREASE INVALID TO MODIFIED PROTOCOL OCCURRENCES IN A COMPUTING SYSTEM

BACKGROUND

A multi-processor computing system may include multiple computer processors which may work together on a program or operation. Each processor may access the same data or instructions repeatedly. To increase the bandwidth of the multi-processor computing system, each processor may have its own cache which is separate from a shared main memory of the multi-processor computing system. The shared main memory may be slower than the cache, and each processor can store as much information as possibly stored in its cache to avoid accessing the shared main memory.

BRIEF DESCRIPTION OF THE DRAWINGS

Various embodiments of the present invention will be understood more fully from the detailed description given below and from the accompanying drawings of various embodiments of the invention.

FIG. 5 illustrates a table including entries that indicate actions for a processor to perform in view of mask bits and a wait for I2M status indicator according to one embodiment.

DESCRIPTION OF EMBODIMENTS

Figure 1:
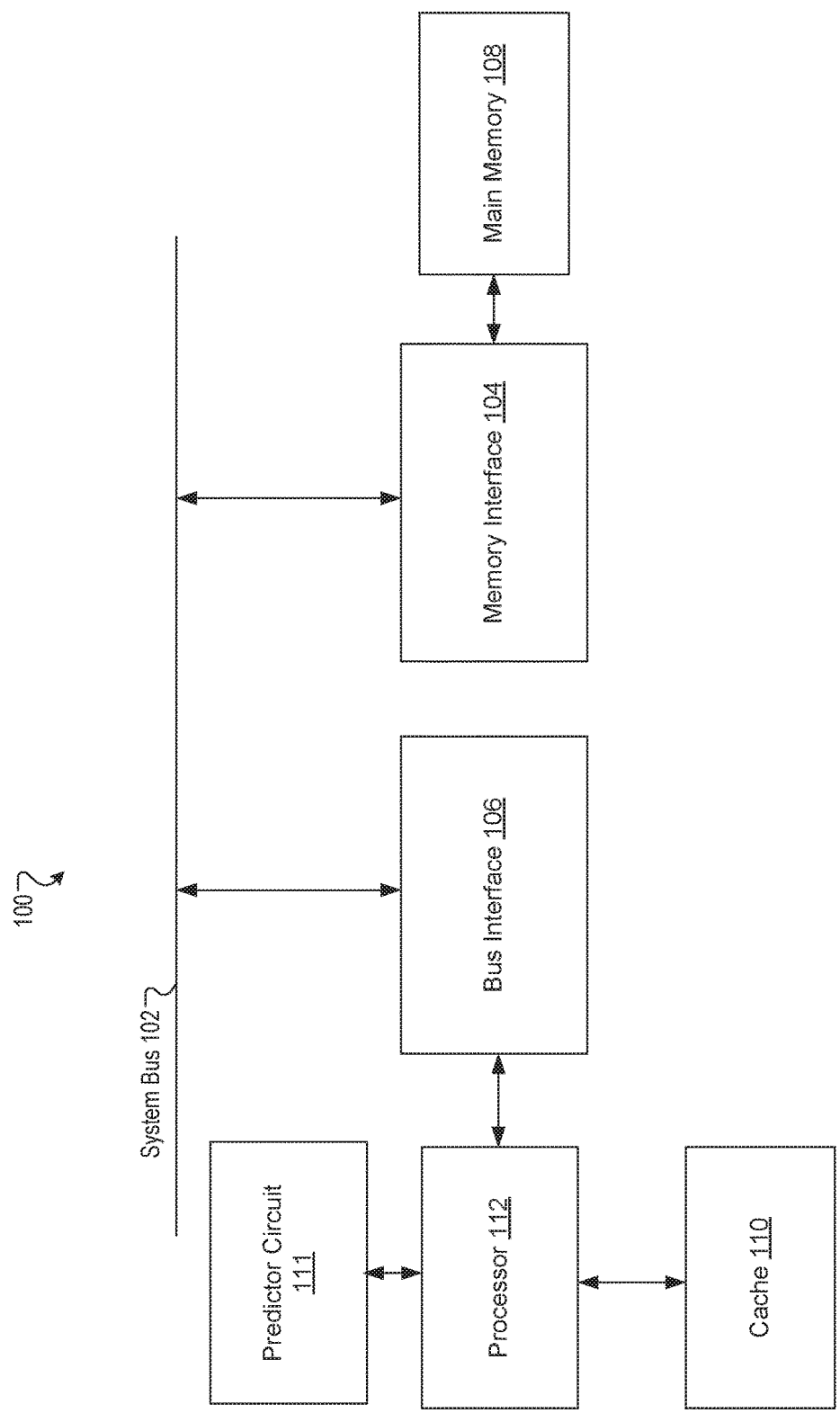
FIG. 1 shows a computing system that includes a main memory and a processor with a cache according to one embodiment.

Some computing systems employ multi-level memory systems. The multi-level memory system may include relatively fast, expensive, limited-capacity caches at the highest level of the memory system and a relatively slower, lower cost, higher capacity main memory at the lowest level of the memory system. Some computing systems employ multiple processors, each of which has one or more caches and one or more processor cores. The caches may be physically integrated within a processor of a computing system or mounted physically approximate to the processor for increased speed when accessing the cache memory. The processors in the computing system may share the main memory.

A minimum amount of data stored in a cache that may be transferred between the cache and the main memory may be referred to as a memory line, a cache line, or a cache block. When the processors share the main memory, a particular memory line may simultaneously exist in the main memory and in one or more of the caches of the multiple processors.

To maintain coherency between the caches and the main memory, the memory lines in the caches and the main memory must be identical to each other. For example, a first processor may write data to a first cache. When a second processor reads data from a second cache, the second processor should read the data that was written into the first cache because the data in the first cache line is the current data for that cache line in the memory system. To enable the second processor to access the updated memory line, the data written to the memory line of the first cache is copied to the main memory and the other caches in the memory system.

The computing system may use cache coherency protocols to maintain the coherency between the caches of the multiple processors so that when a memory line is updated in one cache, the change is propagated to the other caches and main memory. For example, when accessing a memory line, the processors are to use the current memory line in the memory system. As a processor modifies a memory line in a cache, the modified memory line becomes the current memory line in the memory system. The cache storing the modified memory line holds the only valid copy of that memory line in the memory system. The memory lines in the other caches and main memory in the memory system must be updated or invalidated to maintain coherency. If a memory line is not updated or invalidated in the other caches and main memory, those memory lines are stale memory lines, e.g., memory lines that are not identical to the updated memory line. A processor using the memory lines that are stale may cause a program or system error.

To maintain coherency, the computing system may implement the cache coherence protocols to set a state of each memory line to an invalid state, a shared state, a modified state, or an exclusive state. The invalid state, the shared state, and the modified state indicate different ownership statuses of a processor for a cache line. When the memory line is in the modified state, the processor may modify the memory line. When the processor modifies the memory line, the data in the memory line of the cache is inconsistent with the data of the memory line in the main memory and the other caches. When a processor changes a cache line from another state to a modified state, the processor must write the memory line to the main memory when the memory line is evicted from the cache.

When a memory line is in a shared state, the memory line is in a read-only state. A processor may evict the memory line that is in the shared state from a cache without writing the data in the memory line to the main memory. When a memory line is in an invalid state, the memory line is empty and the processor fetches the data for the memory line from the main memory or from another cache.

Conventionally, a processor may only write data to a memory line in a cache or the main memory when the memory line is in the modified state. For example, a processor may attempt to write data to a memory line and determine that the memory line is in a shared state and cannot be written to, e.g., a miss. When the memory line is in a shared state, all other memory lines stored in the other caches of the memory system must be invalidated first. To invalidate the memory lines in the other caches, a processor may broadcast a request for ownership (RFO) to the other processors in the computing system.

The RFO is an operation in the cache coherency protocols that combines a read operation and an invalidate operation. For example, the RFO operation is an operation performed by a processor that executes a read operation to read data from a memory address in the main memory with an intent to write data to the memory address. The processor writes the data to a cache and invalidates all other memory lines in the caches storing this memory line. When the RFO protocol is completed, the processor may add new data to the current data of the memory line when the memory line has sufficient space remaining. Conventionally, to write the data set to the memory line, a request for ownership (RFO) is sent and two responses are returned: an ownership confirmation and the initial data of the memory line. Additionally, a state of the memory line state is changed from an exclusive state to a modified state when bytes of the memory line are rewritten with new data. The sending and receiving of a request and data for the RFO operations may use a significant amount of bandwidth within the memory system. The reduction of bandwidth limits a performance of a central processing unit (CPU) in the computing system.

The embodiments described herein may address the above noted deficiencies by reducing a number of RFO operations and an amount of data transmitted in a memory system. A coherency protocol may reduce a number of RFO operations and an amount of data transmitted in the memory system by converting RFO operations to invalid-to-modified (I2M) operations. The I2M operations decrease a cross-cache bandwidth usage in a computing system by eliminating a processor fetching the data that is initially stored in a memory line. When contiguous stores rewrite an entire memory line, a state of the memory line may be changed directly from invalid to modified without performing an RFO operation. To reduce the number of RFO requests by performing I2M requests, a computing system may predict a stable stream of contiguous stores using a predictor circuit. When the computing system predicts writing contiguous data sets to memory lines in a cache, RFO operations for the data sets may be postponed and I2M operations may be performed. Reducing the number of RFO operations in the memory system may increase a performance of the CPU in the computing system. Reducing the number of RFO operations may also decrease a power consumption of the computing system.

FIG. 1 shows a computing system 100 that includes a main memory 108, a processor 112 with a cache 110, and a predictor circuit 111 according to one embodiment. In one embodiment, the computing system 100 may be a system on a chip (SoC). In another embodiment, the computing system 100 may be an integrated circuit (IC). The computing system 100 may include a system bus 102 coupled to a memory interface 104 and a bus interface 106. The memory interface 104 is coupled to the main memory 108. The bus interface 106 is coupled to the processor 112, and the processor 112 is coupled to the cache 110. In one embodiment, a predictor circuit 111 may be coupled to the processor 112, as discussed in greater detail below. When the processor 112 requires data (such as for executing a software program), the processor 112 may check the cache 110.

In one embodiment, when the data is stored in a memory line of the cache 110, the processor 112 may use the data in the memory line. In another embodiment, the memory structure of the cache 110 and the main memory 108 is configured based on a cost-performance balance of accessing the cache 110 and the main memory 108. For example, cache 110 may include static random access memory (SRAM) cells and the main memory 108 may include dynamic random access memory (DRAM) cells. DRAM cells are typically slower and cheaper than SRAM memory cells, resulting in greater latency and reduced system performance whenever information is retrieved from the main memory 108 or stored in the main memory 108. Additionally, because the main memory is accessed via the bus 102, each memory access consumes bandwidth of the computing system 100.

In one embodiment, the storage capacity of the main memory 108 is larger than the storage capacity of the cache 110. Most of the information stored within the computing system 100 may be stored in the main memory 108. Because the cache 110 uses the SRAM cells, the cache 110 is comparatively faster and more expensive than main memory 108. To minimize the cost of computing system 100, the cache 110 may have a lower storage capacity than the main memory. To take advantage of the higher speed of the cache 110, the processor may access the cache 110 more frequently than the main memory 108 to retrieve data. The computing system 100 may be designed so that data needed at any instance in time by the processor 112 is more likely to found in the cache 110 than the main memory 108.

If the data is not stored in the cache 110, the processor 112 send a request for the data to the memory interface 104 via the system bus 106. The memory interface 104 may retrieve the data from a memory line in the main memory 108. The memory interface 104 may send the data over the system bus 102 to the bus interface 106. The bus interface 106 may forward the data to the processor 112. The processor 112 may use the data for the execution of the software program.

In one embodiment, when a memory line is modified in the cache 110, the memory line may immediately be modified in the main memory 108, i.e., a memory line write through. In another embodiment, when a memory line is modified in the cache 110, the processor 114 may only write the modified memory line to the main memory 108 when the modified memory line in the cache 110 is in a modified state following an I2M request, i.e., a memory line write back. For example, when a memory line in the cache 110 is modified, the processor 114 changes the memory line to a modified state. The processor 114 may request a change in state to change a memory line in the cache 110. When the processor 114 changes data stored the memory line, other processors and the memory interface 104 may invalidate any shared copies of the data in the memory line.

When the processor 112 labels a memory line read as an RFO, the information read from the memory line read is going to be written over shortly after the read from main memory 108 is performed. By labeling a memory read as an RFO, the processor may notify other processors and elements in the memory system 100 that the present data in main memory 108 at the location where the memory read is going to take place is going to be replaced momentarily. The other processors and elements that have the current information from the memory location may invalidate the copy of the information stored in the corresponding caches, queues, registers, main memory, and so forth. In another example, the bus interface 106 typically has logic that detects the RFO notice and broadcasts the RFO notification over the system bus 102 to the other processors and elements in the computing system 100.

Figure 2:
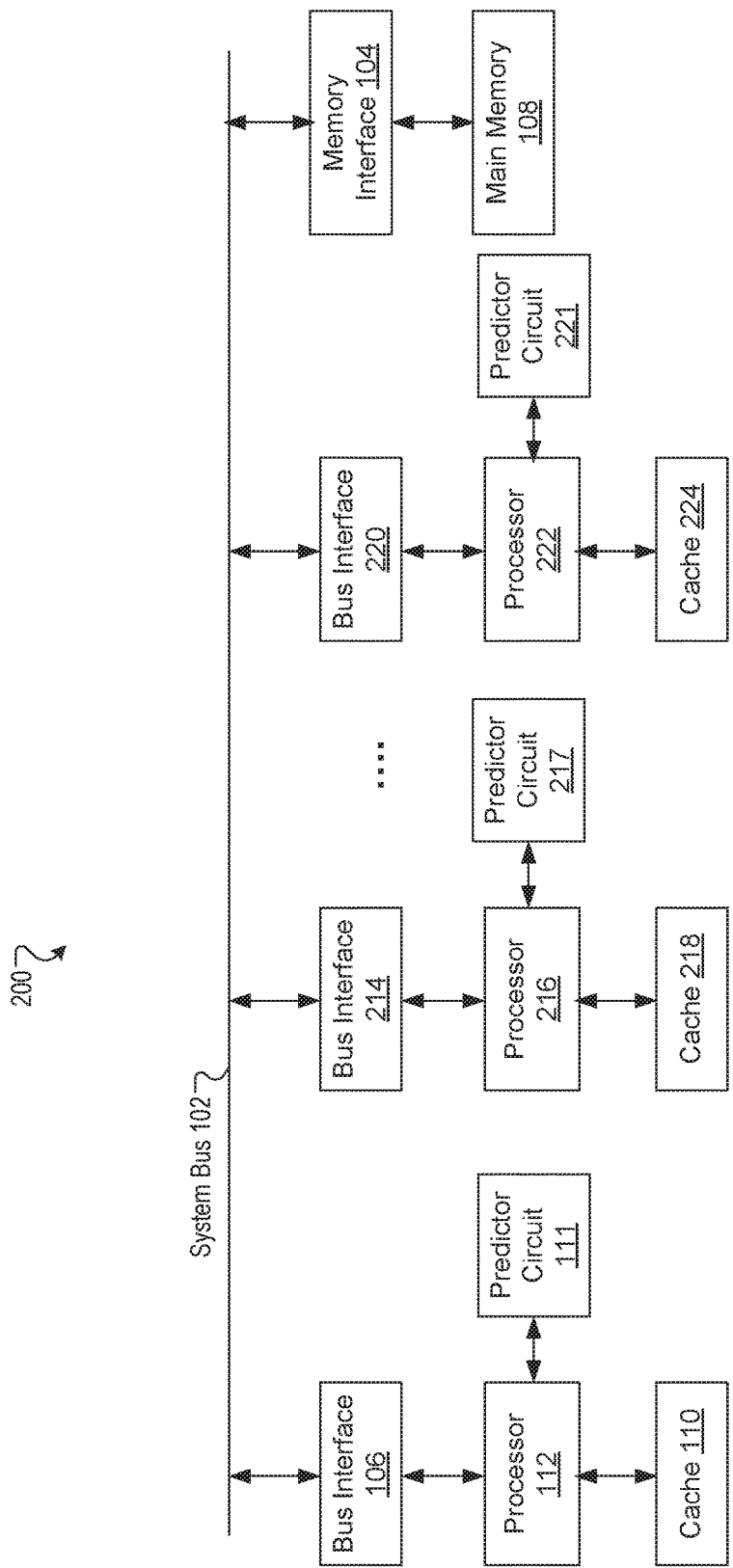
FIG. 2 shows a computing system that includes a main memory and processors with caches according to one embodiment.

FIG. 2 shows a computing system 200 that includes a main memory 108, processors 112, 216, and 222 with caches 110, 218, and 224, and predictor circuits 111, 217, and 221, respectively, according to one embodiment. Some of the features in FIG. 2 are the same or similar to the some of the features in FIG. 1 as noted by same reference numbers, unless expressly described otherwise. The computing system 116 may include the system bus 102 coupled to the memory interface 104 and bus interfaces 106, 214, and 220. The memory interface 104 is coupled to the main memory 108. The bus interface 106 is coupled to the processor 112 and the processor 112 is coupled to the cache 110. The bus interface 214 is coupled to the processor 216 and the processor 216 is coupled to the cache 218. The bus interface 220 is coupled to the processor 222 and the processor 222 is coupled to the cache 224. In one embodiment, the predictor circuit 111 may be coupled to the processor 112, the predictor circuit 217 may be coupled to the processor 216, and the predictor circuit 221 may be coupled to the processor 222, as discussed in greater detail below.

The memory structure of the caches 110, 218, and 224 and the main memory 108 is configured based on a cost-performance balance of accessing the caches 110, 218, and 224 and the main memory 108. For example, caches 110, 218, and 224 may include the SRAM cells and the main memory 108 may include the DRAM cells.

When one of the processors 112, 216, or 222 requires data (such as for executing a software program), the processor 112, 216, or 222 may check the cache 110, 218, or 224. If the data is not stored in the cache 110, 218, or 224, the processor 112, 216, or 222 send a request for the data to the memory interface 104, via the system bus 102, respectively. The memory interface 104 may retrieve the data from the main memory 108. The memory interface 104 may send the data over the system bus 102 to the bus interface 106, 214, or 220 of the processor. The bus interface 106, 214, or 220 may forward the data to the processor 112, 216, or 222, respectively. The processor 112, 216, or 222 may use the data for the execution of the software program.

In one embodiment, to avoid coherency issues, the processor 112, 216, or 222, may first obtain RFO permission from the other processors and the computing system 116 that manages the main memory 108 when the processor 112, 216, or 222 attempts to change data in cache 110, 218, or 224, respectively. For example, the processor 112 may read a first data value from a memory address that the main memory 108 and the processor 216 may also read from. The processor 216 may then receive a request, such as from a software application executed by the processor 216, to change the first data value to a second data value. To avoid the coherency issues, the processor 216 may first perform an RFO operation, as discussed above. When the processor 216 has performed the RFO operation, the processor may change the first data value to the second data value in the cache 218 as well as the caches 110 and 224 and the main memory 108. In another embodiment, when the processor 216 receives a request to change the first data value, the processor 216 may perform an I2M operation to change the first data value to a second data value.

Figure 3:
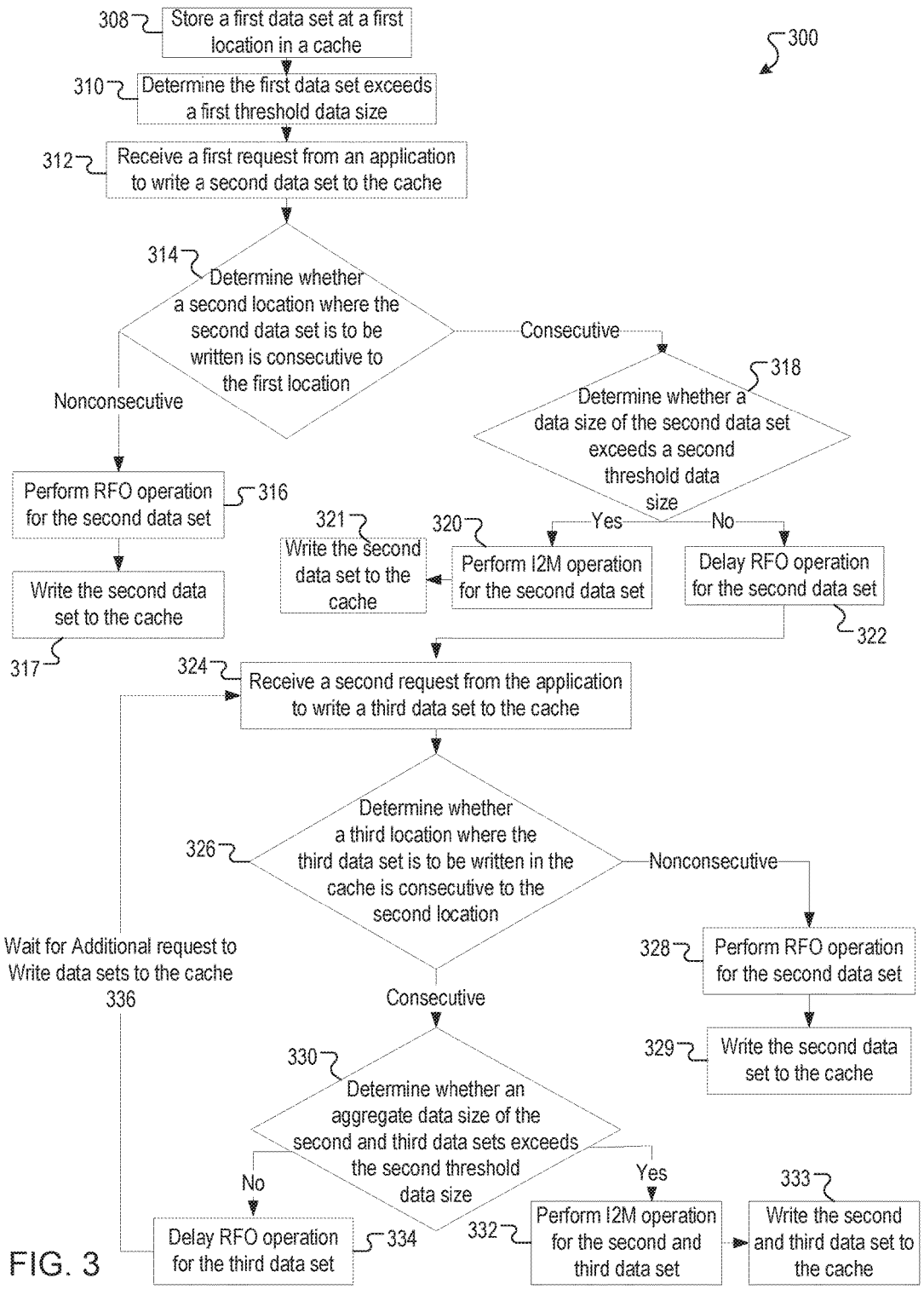
FIG. 3 illustrates a flowchart of a method for determining when to issue an I2M operation according to one embodiment.

FIG. 3 illustrates a flowchart of a method 300 for determining when to issue an I2M operation according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. In one embodiment, the method 300 may be performed by all or part of the computing system 200 of FIG. 2. For example, the method 300 may be performed by one or more of the processor 112, 216, or 222.

Referring to FIG. 3, the method 300 begins with a processor storing a first data set at a first location in a cache (block 308). In one example, the processor may receive the first data set from a software application executed by the processor and store the first data set in the cache. In another example, the processor may receive the first data set from another device coupled to the processor and store the first data set in the cache. The method may include the processor determining that the first data set exceeds a first threshold data size (block 310). In one example, the first threshold data size may be a size of 2 memory lines in the cache. In another example, the first threshold data size may be a data size of 128 bits. In one embodiment, when the data size of the first data set exceeds the first threshold data size, the processor may switch to a speculative I2M mode. In another embodiment, when a load instruction and a store instruction in an instruction set access the same memory location as, the processor may switch from a speculative I2M mode to an RFO mode. The following pseudo code is an example of a disturbing load:

(1) STORE 4 bytes to 0xfadd100
(2) LOAD 4 bytes to 0xfadd110
(3) STORE 4 bytes to 0xfadd104
(4) STORE 4 bytes to 0xfadd108
(5) STORE 4 bytes to 0xfadd10c
(6) STORE 4 bytes to 0xfadd110

The instructions (1) and (3)-(6) store consecutive data sets and the speculative I2M mode may be enabled. However, instruction (2) is an operating to read unchanged data, i.e. the initial data which was here before performing instruction (6). When a set of operation includes an instruction to fetch initial data the speculative I2M mode is disable and the RFO mode is enabled. As the load operation at instruction (2) disables the speculative I2M mode, instruction (2) is a disturbing load since.

When the processor is in the speculative I2M mode, the processor may delay RFO operations until one or more consecutive data sets are to be written to the cache by an I2M operation or one or more nonconsecutive data sets are to be written to the cache by an RFO operation. In the RFO mode, the processor may execute RFO operations.

The method may include the processor receiving a first request from the application to write a second data set to the cache (block 312). The method may include a predictor circuit determining whether a second location where the second data set is to be written in the cache is consecutive to the first location (block 314). In one example, the predictor circuit may determine whether the second location is consecutive to the first location by determining a first effective virtual address (VA) location of the first location. The predictor circuit may increment the first effective VA location of the first location by a data size of the second data set to obtain a second effective VA location and determine a third effective VA location of the second location. In one example, when the third effective VA location is different from the second effective VA location, the second location is nonconsecutive to the first location. In another example, when the third effective VA location is the same as the second effective VA location, the second location is consecutive to the first location.

When the second data set is nonconsecutive to the first location, the method may include performing an RFO operation for the second data set (block 316). The method may include the processor writing the second data set to the second location in the cache (block 317). The method may include storing the first data set and the second data set in the cache using a modified exclusive shared invalid (MESI) protocol to maintain memory coherency between caches in a computing system.

When the second location is consecutive to the first location, the method may include the processor determining whether a data size of the second data set exceeds a second threshold data size (block 318). The second threshold data size may be a size of the memory remaining in a memory line after the first data set is to be written to memory. To determine whether a data size of the second data set or an aggregate of multiple data sets, as discussed below, exceeds threshold data sizes, the data sets may be stored in a fillbuffer (FB). The FB may include an entry with a plurality of mask bits to indicate the aggregate data size of the data sets. For example, when the second threshold data size is 64 bits, the FB may have 64 mask bits corresponding to each bit of the data sets. When a first data set is 24 bits, 24 mask bits may be set to indicate that 24 bits of the entry in the FB are filled, where a mask bit set to 1 indicates the bit is full and a mask bit set to 0 indicates the bit is empty. When a second data set is 40 bits, 40 mask bits may be set to indicate that 40 bits of the entry in the FB are filled. The entry may also include an indicator bit to indicate when all of the bits in the entry are filled. The indicator bit may also indicate to a processor to perform the I2M operation for the data sets when the plurality of mask bits indicate the aggregate data size of the data sets exceeds the second threshold data size.

When the data size of the second data set exceeds the second threshold data size, the method may include the processor performing an I2M operation for the second data set (block 320). In one example, the second location is a memory line in the cache that is set to an invalid state. When the data size of the second data set exceeds the second threshold data size, the processor may perform the I2M operation for the second data set to switch a memory line that the second data set is to be written to from an invalid state to a modified state. The method may include the processor writing the second data set to the second location in the cache (block 321). The method may include storing the first data set and the second data set in the cache using a MESI protocol to maintain memory coherency between the caches in the computing system.

The method may include the processor receiving a second request from the application to write a third data set to the cache (block 324). The method may include the predictor circuit determining whether a third location where the third data set is to be written in the cache is consecutive to the second location (block 326). In one example, the third location is consecutive to the second location when the second data set and the third data set are contiguous data sets from an application. In another example, the third location is nonconsecutive to the second location when the second data set and the third data set are noncontiguous data sets from the application. When the third data set is nonconsecutive to the second location, the method may include the processor performing the RFO operation for the third data set (block 328). When the third location is consecutive to the second location, the method may include the predictor circuit determining whether an aggregate data size of the second data set and the third data set exceeds the second threshold data size (block 330). When the aggregate data size of the second data set and the third data set exceeds the second threshold data size, the method may include the processor performing an I2M operation for the second data set and the third data set (block 332). In one embodiment, the processor may change the second threshold to be a data size of a remaining memory line. For example, the second threshold data size may be set to a data size of an amount of memory remaining after the first data set is to be written to memory. When the aggregate of the first data set and the second data set partially fill the memory line, the processor may update the second threshold to be a data size of the memory line remaining after the first data set and the second data set are to be written to memory. The threshold may be iteratively updated to be a remaining data size of the memory line until the aggregate of the data sets exceeds the data size of a memory line. The method may include the processor writing the second data set to the second location in the cache and the third data set to the third location in the cache (block 333). The method may include the processor storing the first data set, the second data set, and the third data set in the cache using the MESI protocol to maintain memory coherency between the caches in the computing system.

When the aggregate data size of the second data set and the third data set does not exceed the second threshold data size, the method may include the processor delaying performing an RFO operation for the second data set and the third data set (arrow 334).The method may include the processor iteratively performing blocks 324-334 until the RFO operation or the I2M operation are performed for the data sets to be written to the cache (block 336). The method may include the processor storing the second data set, the third data set, and any subsequent consecutive data sets in a buffer until the processor performs the RFO operation or the I2M operation. For example, a buffer may be coupled to a processor. As the processor receives the data sets and until the processor determines whether to perform the RFO operation or the I2M operation for the data sets, the processor may store the data sets in the buffer. When the processor determines whether to perform the RFO operation or the I2M operation, the processor may write the data sets to a cache and/or main memory according to the RFO operation or the I2M operation.

Figure 4:
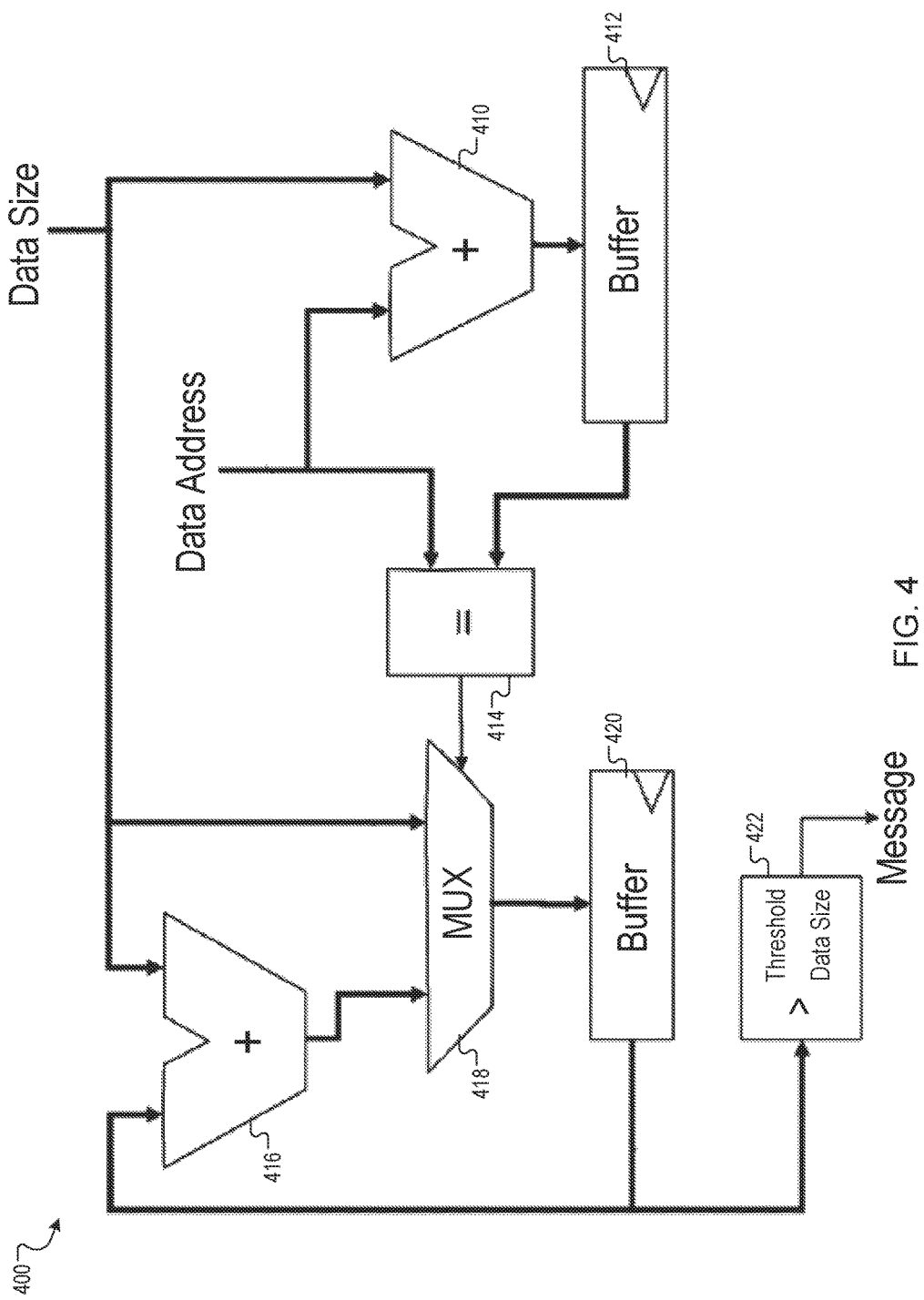
FIG. 4 illustrates a predictor circuit for determining whether memory locations to write data sets are consecutive according to one embodiment.

FIG. 4 illustrates a predictor circuit 400 for determining whether memory locations to write data sets to are consecutive according to one embodiment. The predictor circuit 400 may determine whether a first data set to be written to a cache by a processor and a second data set to be written to the cache by the processor are to be written at consecutive locations in a memory line of the cache, such as to a same memory line. The predictor circuit 400 may include a first adder 410, a first buffer 412, a comparator 414, a second adder 416, a multiplexer 418, a second buffer 420, and a threshold comparator 422. In one embodiment, the predictor circuit 400 may be integrated into a multi-core processor or a system on a chip (SoC). In another embodiment, the predictor circuit 400 may be coupled to the multi-core processor or the SoC.

The first adder 410 may receive, from a processor, a data size of a second data set and a first memory address of a first location where a first data set is to be written to in a memory line of the cache. The first adder 410 may determine an effective second memory address that is consecutive to the first memory address. The first buffer 412 may be coupled to the first adder 410. The first buffer 412 may receive and buffer the effective second memory address. The comparator 414 may be coupled to the first buffer 412. The comparator 414 may receive a second memory address from the processor and determine whether the second memory address is the same as the effective second memory address. The second adder 416 may add the data size of the first data set to the data size of the second data set to obtain an aggregate data size of the first data set and the second data set.

The multiplexer 418 may be coupled to a second buffer 420. The multiplexer 418 may receive the aggregate data size from the second adder 416, the data size of the second data set from the processor, and an indicator from the comparator 414 of whether the second memory address is the same as the effective second memory address. The multiplexer 418 may send a value correlating to the aggregate data size to the second buffer 420 when the second memory address is the same as the effective second memory address. The second buffer 420 may store the value. The threshold comparator 422 may be coupled to the second buffer 420. The threshold comparator 422 may determine whether the aggregate data size exceeds a threshold data size. In one example, the threshold comparator 422 may send an instruction, to the processor, to perform an I2M operation when the aggregate data size exceeds the threshold data size. In another example, the threshold comparator 422 may send an instruction, to the processor, to delay an RFO operation when the aggregate data size does not exceed the threshold data size.

As a processor of a computing system receives a request to write a data set to the cache, the computing system may use the predictor circuit 400. The first buffer 412 and the second buffer 420 are updated with each request to write a data set to the cache. For example, when the processor receives a request to write a data set to the cache, the effective memory address that is consecutive to the current memory address is stored in the first buffer 412 and the predictor circuit 400 determines whether an actual memory address to write the data set matches the effective memory address.

FIG. 5 illustrates a table 500 including entries 518-524 that indicate actions 516 for a processor to perform in view of mask bits 512 and a status indicator 514 according to one embodiment. The FB entries 518-524 in the table 500 each include an entry identifier 510, mask bits 512, the status indicator 514, and an action indicator 516. Each of the mask bits 512 correlate to a byte in one or more data sets stored in the FB. A mask bit that is set to 1 indicates that a corresponding location in the FB is storing a byte of a data set. A mask bit that is set to 0 indicates that a corresponding location in the FB is empty, e.g., the location is not storing a byte of a data set. The mask bit may be updated by each data store that writes data to the FB. The status indicator 514 indicates whether a processor is to wait to perform an RFO operation or an I2M operation until another data set is received at the processor or perform the RFO operation or the I2M operation for one or more data sets stored in the FB. The action indicator 516 indicates an action the processor is to perform in view of the settings of the mask bits 512 and the status indicator 514.

The FB entry 518 illustrates an FB entry #0 where the mask bits 512 in a bytes written field are all set to 1. When all the mask bits 512 of FB entry 518 are set to 1, the corresponding entry storing one or more data sets is full. When the status indicator 514 of entry 518 is set to false and the mask bits 512 are all set to 1, the processing device may execute an I2M operation for the data sets stored in the FB. In one embodiment, the status indicator 514 may be set to false when the I2M operation is to be performed (block 320 in FIG. 3). In another embodiment, the status indicator 514 may be reset to false when the speculative I2M mode for the computing system is disabled. For example, the speculative I2M mode for the computing system may be disabled when a first data set stored in the cache is below a threshold data size, such as a 128-byte threshold. In another embodiment, the status indicator 514 may be reset to false when a load attempts to read initial, non-modified data from an entry in the FB entry. In another embodiment, the status indicator 514 may be reset to false when FB entry drain is requested by a fence. In one example, a fence may be a memory barrier that is an operation that causes a processor to complete all memory operations before starting any memory operations after the barrier. For example, if the fence reached an FB, all FB entries assigned to operations before the fence may be completed as soon as possible and the speculative I2M mode is switched off.

The FB entry 520 illustrates an FB entry #1 where one or more mask bits 512 in the bytes written field are set to 0. When one or more of the mask bits 512 of FB entry 520 are set to 0, the corresponding entry storing one or more data sets is not full. When the status indicator 514 of entry 518 is set to false and one or more of the mask bits 512 are set to 0, the processing device may execute an RFO operation for the data sets stored in the FB. For example, the status indicator 514 may be set to false when performing an RFO operation (block 316 in FIG. 3).

The FB entry 522 illustrates an FB entry #2 where one or more mask bits 512 in the bytes written field are set to 0. When one or more of the mask bits 512 of FB entry 522 are set to 0, the corresponding entry storing one or more data sets is not full. When the status indicator 514 of entry 518 is set to true and one or more of the mask bits 512 are set to 0, the processing device may delay performing an RFO operation or an I2M operation until the processor stores one or more additional data sets in the FB. For example, the status indicator 514 may be set to false and when the RFO and I2M operations delayed (block 322 or 334 in FIG. 3).

The FB entry 524 illustrates an FB entry #3 where all of the mask bits 512 in the bytes written field are set to 1. When the mask bits 512 of FB entry 524 are set to 1, the corresponding entry storing the one or more data sets is full. When the status indicator 514 of entry 524 is set to true and one or more of the mask bits 512 are set to 1, the processing device may change the status indicator 514 from false to true. For example, the status indicator 514 may be set to true when the second data set exceeds the first threshold data size (block 318 of FIG. 3) or when the aggregate data size exceeds the second threshold data size (block 330 in FIG. 3).

Figure 6:
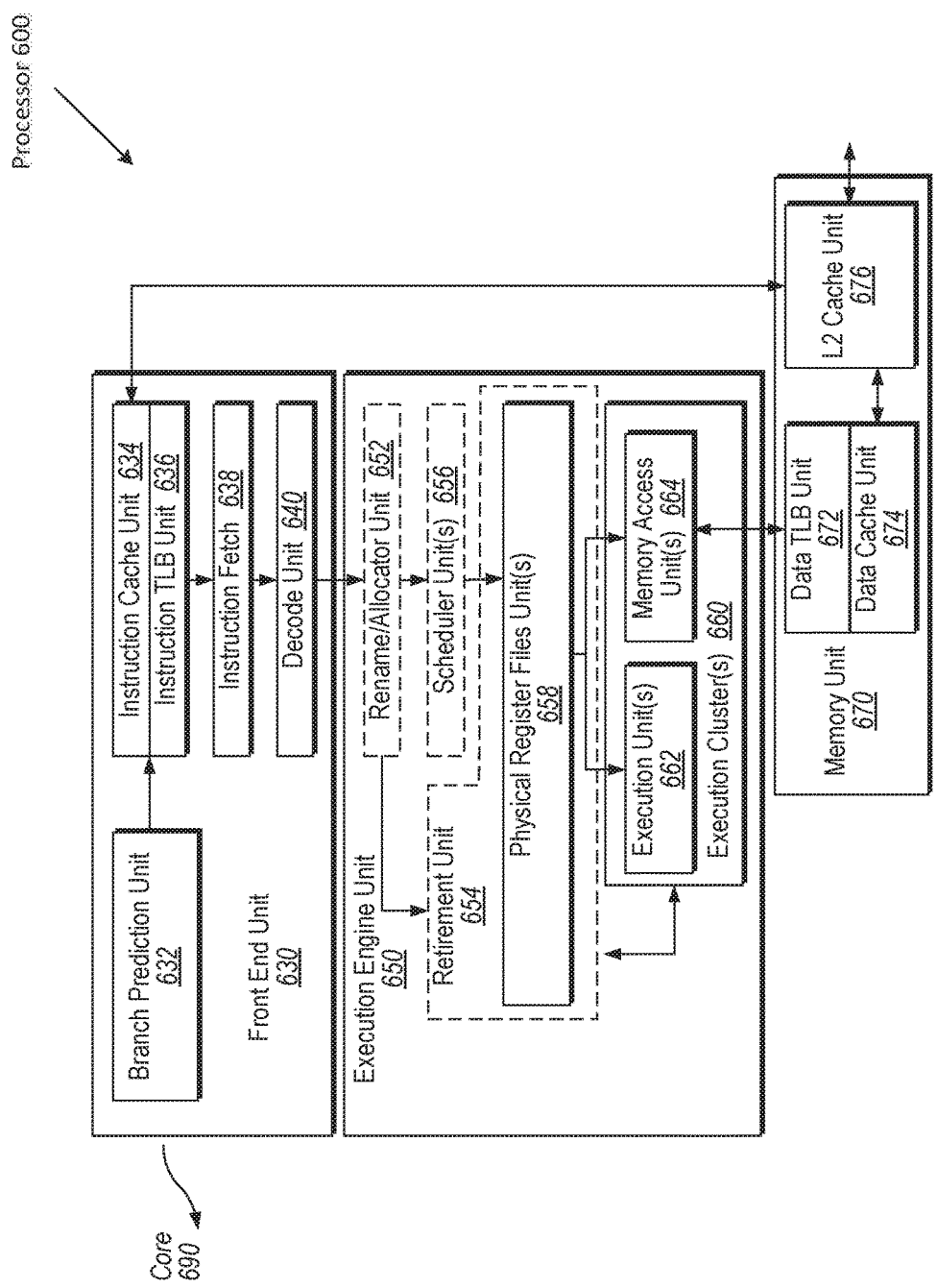
FIG. 6 is a block diagram illustrating a micro-architecture for a processor of FIG. 1 or 2, according to one embodiment.

FIG. 6 is a block diagram illustrating a micro-architecture for a processor 600 that implements the computing system 100 or 200 according to one embodiment. Specifically, processor 600 depicts an in-order architecture core and a register renaming logic, out-of-order issue/execution logic to be included in a processor according to at least one embodiment of the disclosure. The embodiments of the computing system 100 or 200 can be implemented in processor 600.

Processor 600 includes a front end unit 630 coupled to an execution engine unit 650, and both are coupled to a memory unit 670. The processor 600 may include a core 690 that is a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In another embodiment, the core 690 may have five stages.

The front end unit 630 includes a branch prediction unit 632 coupled to an instruction cache unit 634, which is coupled to an instruction translation lookaside buffer (TLB)

unit 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher, a data TLB unit 672, a data cache unit (DCU) 674, and a level 2 (L2) cache unit 676, to name a few examples. In some embodiments, DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to the main memory.

In one embodiment, the data prefetcher speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
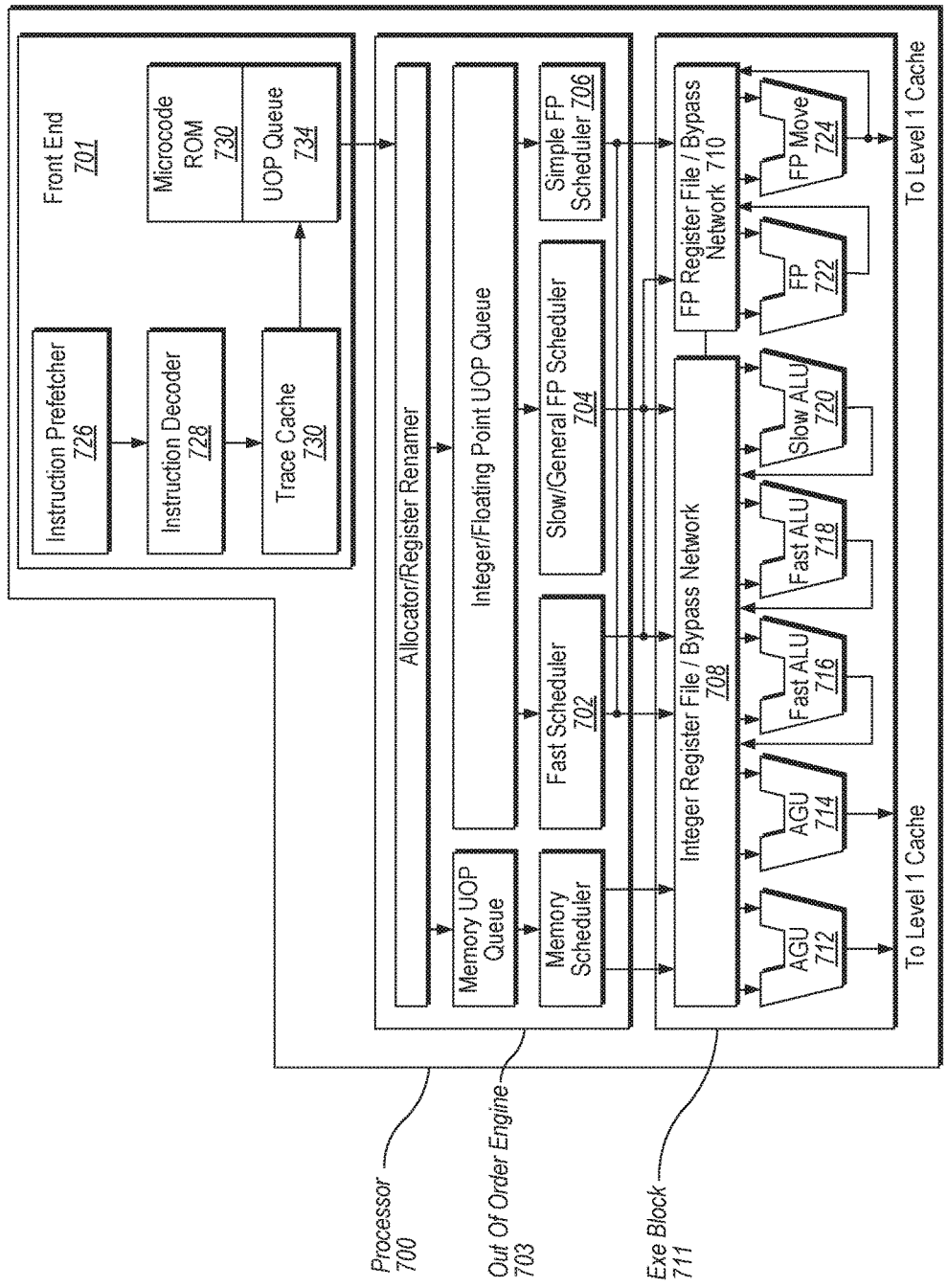
FIG. 7 illustrates a block diagram of the micro-architecture for a processor that includes logic circuits to perform access control, according to one embodiment.

FIG. 7 illustrates a block diagram of the micro-architecture for a processor 700 that includes logic circuits to perform access control according to one embodiment. In one embodiment, processor 700 is the processor 112, 216, or 222 of FIGS. 1 and 2.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the computing system 100 or 200 can be implemented in processor 700.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro-op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro-ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the micro-code, ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64-bit by 64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64-bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement access control according to one embodiment. In one embodiment, the execution block 711 of processor 700 may include PEL, to perform access control according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
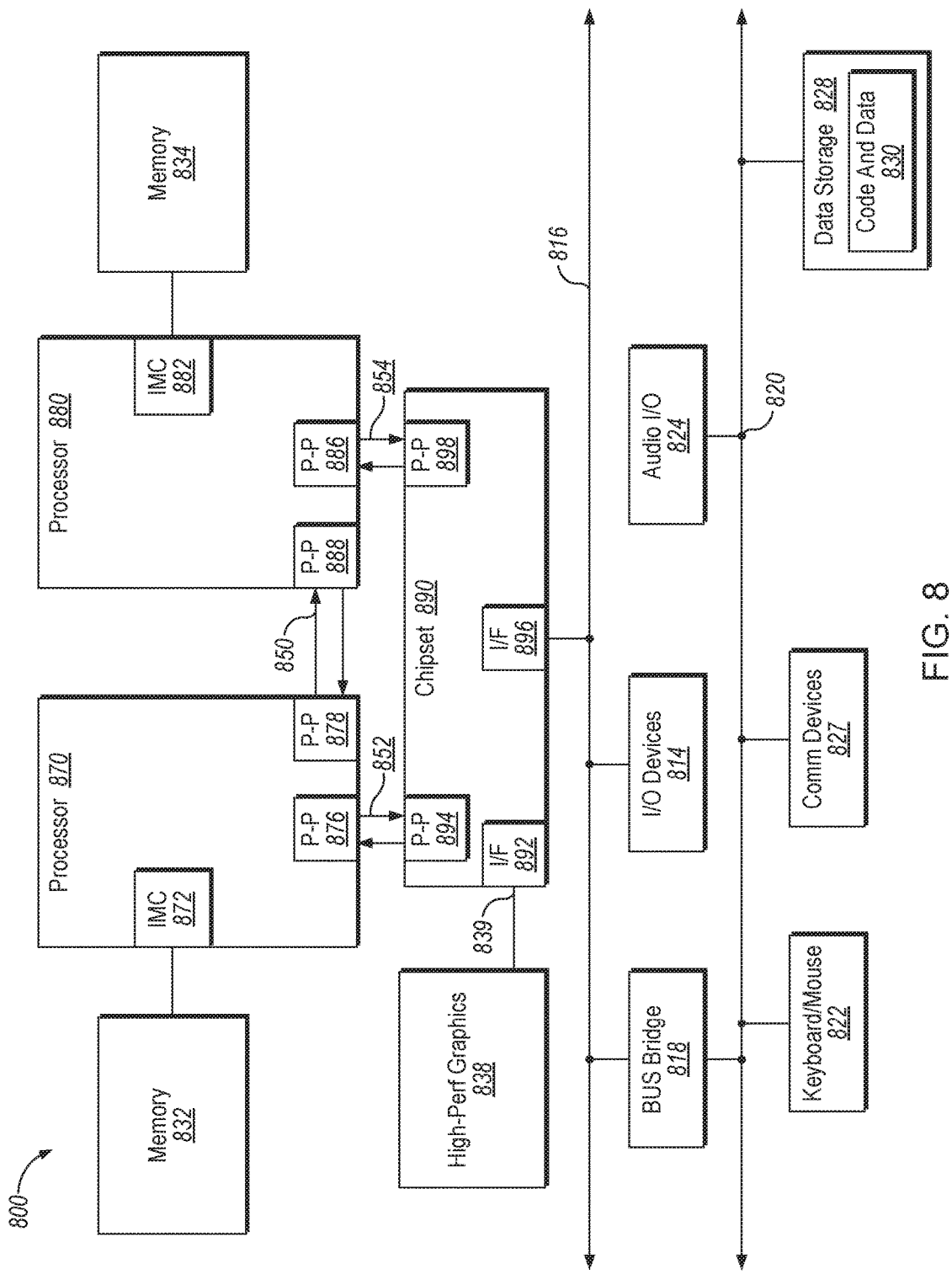
FIG. 8 is a block diagram of a computing system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. The embodiments of the computing system 100 or 200 can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
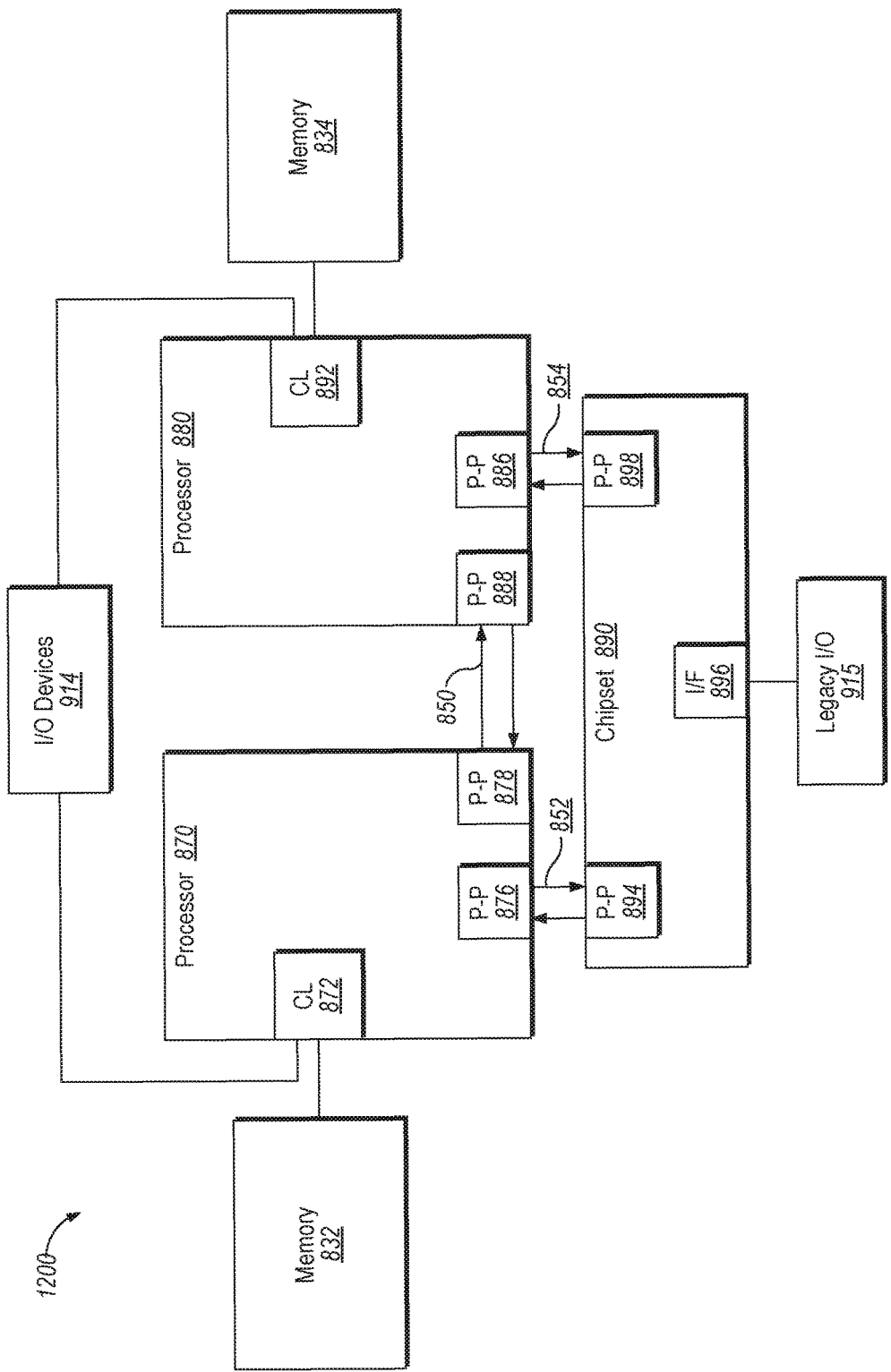
FIG. 9 is a block diagram of a computing system according to another implementation.

Referring now to FIG. 9, shown is a block diagram of a third system 900 in accordance with an embodiment of the present disclosure. Like elements in FIGS. 8 and 9 bear like reference numerals and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. For at least one embodiment, the CL 872, 882 may include integrated memory controller units such as described herein. In addition. CL 872, 882 may also include I/O control logic. FIG. 9 illustrates that the memories 832, 834 are coupled to the CL 872, 882, and that I/O devices 914 are also coupled to the control logic 872, 882. Legacy I/O devices 915 are coupled to the chipset 890. The embodiments of the computing system 100 or 200 can be implemented in processor 870, processor 880, or both.

Figure 10:
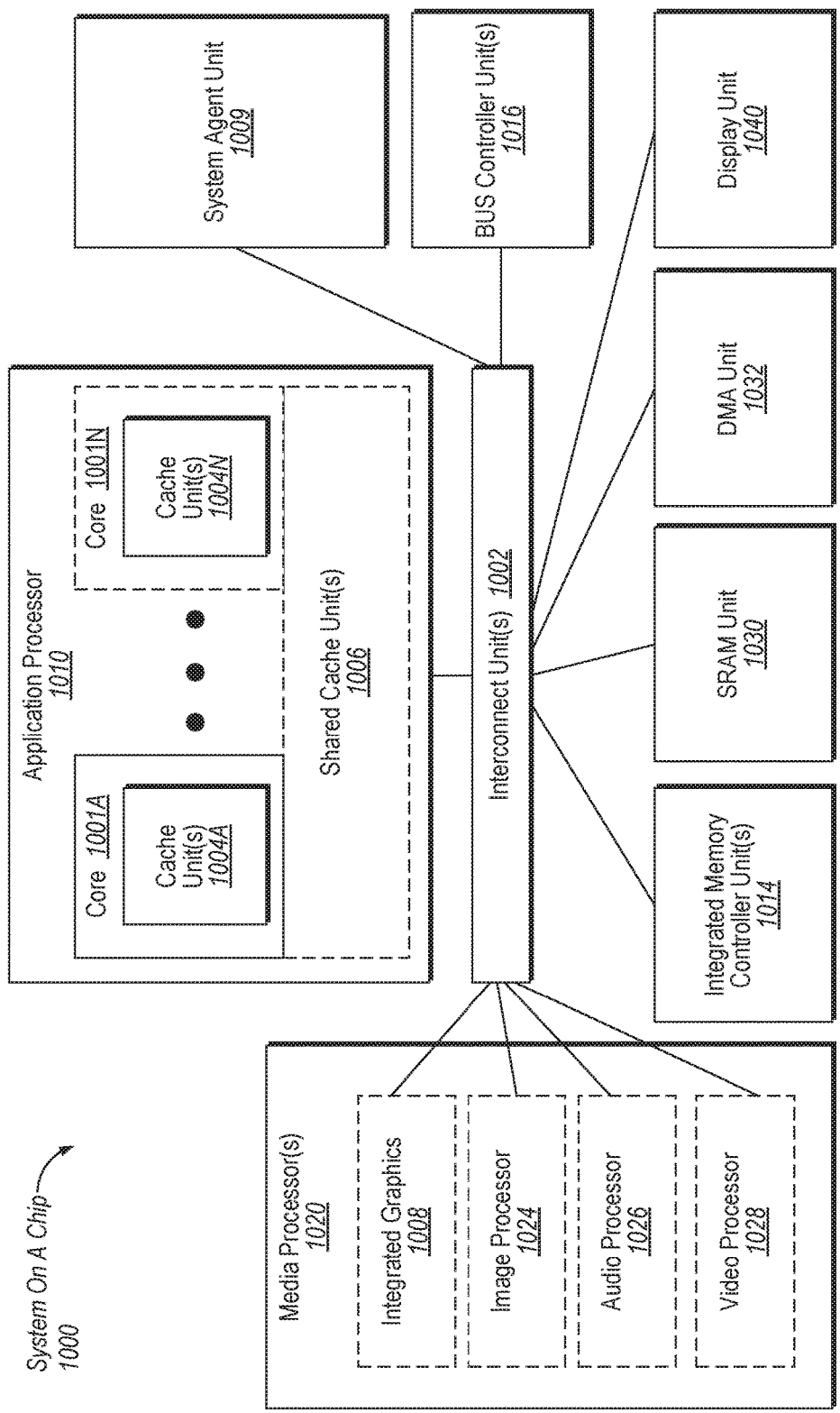
FIG. 10 is a block diagram of a system-on-a-chip according to one implementation.

FIG. 10 is an exemplary system on a chip (SoC) that may include one or more of the cores 1001. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Also, dashed lined boxes are features on more advanced SoCs. In FIG. 10, an interconnect unit(s) 1002 is coupled to: an application processor 1010 which includes a set of one or more cores 1001A-N and shared cache unit(s) 1006; a system agent unit 1009; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying can be implemented in SoC 1000.

Figure 11:
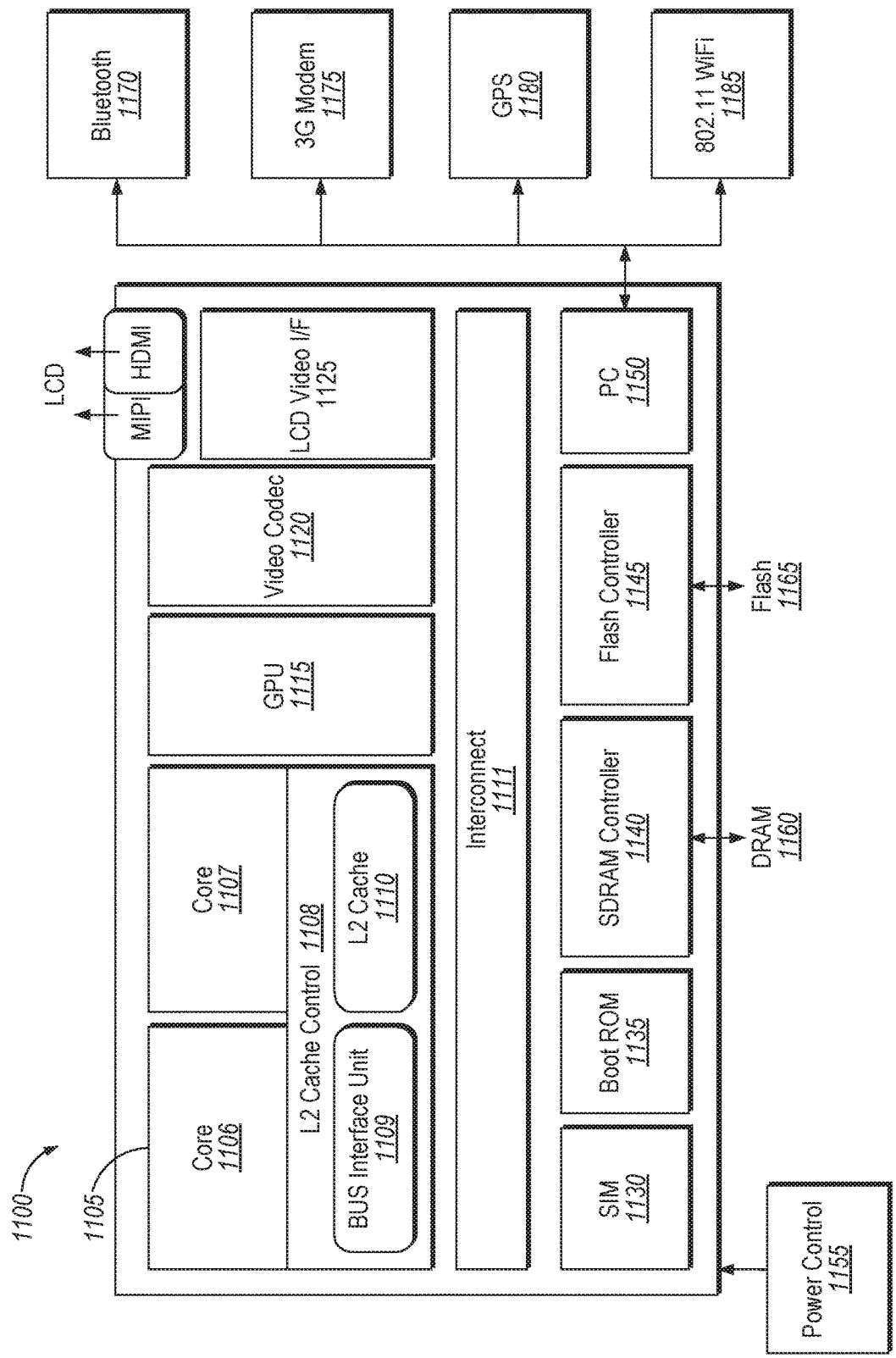
FIG. 11 illustrates another implementation of a block diagram of a computing system.

Turning next to FIG. 11, an embodiment of a system-on-a-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the computing system 100 or 200 can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, an MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch-enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
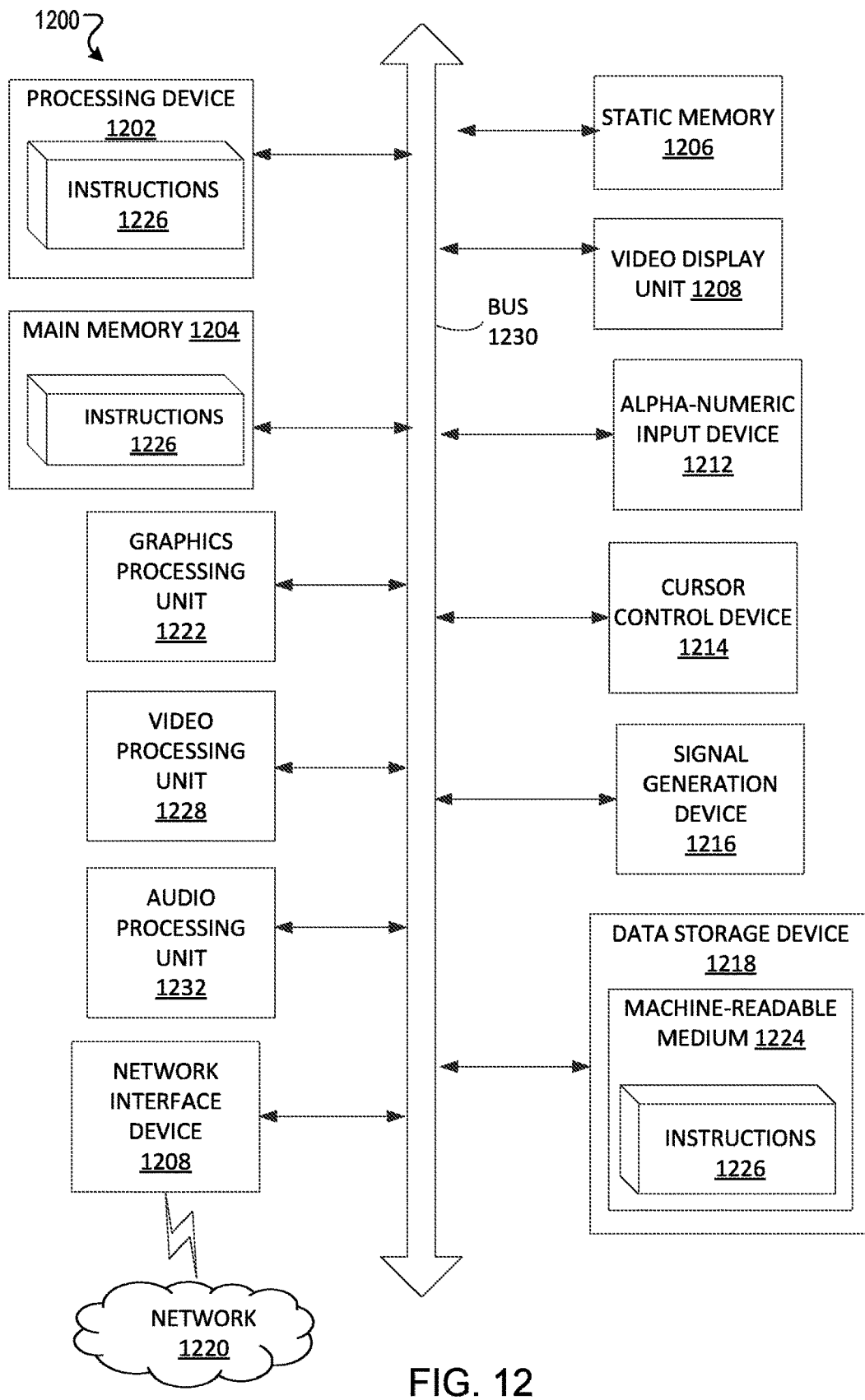
FIG. 12 illustrates another implementation of a block diagram of a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the system 100 can be implemented in computing system 1200.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field-programmable gate array (FPGA), a digital signal processor (DSP), network processor, or the like. In one embodiment, processing device 1202 may include one or processor cores. The processing device 1202 is configured to execute the instructions 1226 (e.g., processing logic) for performing the operations discussed herein. In one embodiment, processing device 1202 can include the processor 112, 216, or 222 of FIGS. 1 and 2. Alternatively, the computing system 1200 can include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored instructions 1226 (e.g., software) embodying any one or more of the methodologies of functions described herein. The instructions 1226 (e.g., software) may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, such as the processor 112, 216, or 222 described with respect to FIGS. 1 and 2, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a multi-core system including: 1) a cache to store data; 2) a processor core coupled to the cache, the processor core to: a) store a first data set at a first location in the cache; and b) receive a first request from an application to write a second data set to the cache; 3) a predictor circuit coupled to the processor core, the predictor circuit to a) determine that a second location where the second data set is to be written to in the cache is consecutive to the first location; and b) determine that a data size of the second data set is smaller than a first threshold data size, where the processor core is to, in response the data size of the second data set being smaller than the first threshold data size and the second location being consecutive to the first location, delay performing a request-for-ownership (RFO) operation for the second data set.

In Example 2, the multi-core system of Example 1, where: 1) the processor core is further to receive a second request from the application to write a third data set to the cache; and 2) the predictor circuit is further to: a) determine that a third location where the third data is to be written to in the cache is consecutive to the second location; and b) determine that an aggregate data size of the second data set and the third data set exceeds a second threshold data size, where the processor core is further to perform an invalid-to-modify (I2M) operation on a memory line in the cache correlating to the second location and write the second data set and the third data set to the memory line.

In Example 3, the multi-core system of any one of Examples 1-2, further including a buffer to data, where the processor core is further to store the second data set and the third data set in the buffer prior to writing the second data set and the third data set to the cache.

In Example 4, the multi-core system of any one of Examples 1-3, where the buffer comprises a buffer entry, the buffer entry including: 1) multiple mask bits to indicate the aggregate data size of the second data set and the third data set; and 2) an indicator bit to indicate to perform the I2M operation for the second data set and the third data set when the multiple mask bits indicate the aggregate data size of the second data set and the third data set exceeds the second threshold data size.

In Example 5, the multi-core system of any one of Examples 1-4, where the first data set, the second data set, and the third data set are contiguous data sets from the application.

In Example 6, the multi-core system of any one of Examples 1-5, where: 1) the processor core is further to receive a second request from the application to write a third data set to the cache; and 2) the predictor circuit is further to determine that a third location where the third data is to be written to in the cache is nonconsecutive to the second location, where the processor core is further to perform the RFO operation on a memory line in the cache correlating to the second location and write the second data set to the memory line.

In Example 7, the multi-core system of any one of Examples 1-6, where the predictor circuit includes: 1) a first adder to: a) receive, from the processor core, the data size of the second data set and a first memory address of the first location where the first data set is to be written to in the cache; and b) determine an effective second memory address is consecutive to the first memory address; 2) a first buffer coupled to the first adder, the first buffer to receive and buffer the effective second memory address; 3) a comparator coupled to the first buffer, the comparator to: a) receive a second memory address from the processor core; and b) determine whether the second memory address is the same as the effective second memory address; 3) a second adder to add the data size of the first data set to the data size of the second data set to obtain an aggregate data size of the first data set and the second data set; 4) a multiplexer coupled to a second buffer, the multiplexer to: a) receive the aggregate data size from the second adder, the data size of the second data set from the processor core, and an indicator from the comparator of whether the second memory address is the same as the effective second memory address, and b) send a value correlating to the aggregate data size to the second buffer when the second memory address is the same as the effective second memory address; 5) the second buffer to store the value; and 6) a threshold comparator coupled to the second buffer, the threshold comparator to: a) determine whether the aggregate data size exceeds the first threshold data size; and b) send, to the processor core, an instruction to perform an invalid-to-modify (I2M) operation when the aggregate data size exceeds the first threshold data size In Example 8, the multi-core system of any one of Examples 1-7, where the first data set exceeds a second threshold data size, the second threshold data size being a size of 2 memory lines in the cache.

Various embodiments can have different combinations of the structural features described above. For instance, all optional features of the computing system described above can also be implemented with respect to the method or process described herein and specifics in the examples can be used anywhere in one or more embodiments.

Example 9 is a system on a chip (SoC) including: 1) a cache to store data; and 2) a processor coupled to the cache, where the processor is operable to: a) store a first data set at a first location in the cache; and b) receive a first request from an application to write a second data set to the cache; and 3) a predictor circuit coupled to the processor, the predictor circuit to determine that a second location where the second data set is to be written to in the cache is nonconsecutive to the first location, where the processor is to perform a request-for-ownership (RFO) operation for the second data set and write the second data set to the cache In Example 10, the processor of Example 9, where the the processor is to perform the RFO operation when a load instruction and a store instruction in an instruction set access a same memory location.

In Example 11, the processor of any one of Examples 9-10, where the first data set and the second data set are noncontiguous data sets received from the application.

In Example 12, the processor of any one of Examples 9-11, where, to determine that the second location is nonconsecutive to the first location, the predictor circuit is further to: 1) determine a first effective virtual address (VA) location of the first location; 2) increment the first effective VA location of the first location by a data size of the second data set to obtain a second effective VA location; 3) determine a third effective VA location of the second location; and 4) determine that the third effective VA location is different from the second effective VA location.

In Example 13, the processor of any one of Examples 9-12, where the second location is a memory line in the cache that is set to an invalid state.

Various embodiments can have different combinations of the structural features described above. For instance, all optional features of the computing system described above can also be implemented with respect to the method or process described herein and specifics in the examples can be used anywhere in one or more embodiments.

Example 14 is a method including: 1) receiving, by a processor core, a first request from an application to write a first data set to a first location in a cache, the first data set exceeding a first threshold data size; 2) in response to the first data set exceeding the first threshold data size, delaying a request-for-ownership (RFO) operation for the first data set; 3) receiving, by the processor core, a second request from the application to write a second data set to the cache; 4) determining, by a predictor circuit, that a second location where the second data is to be written to in the cache is consecutive to the first location; and 5) determine, by the predictor circuit, that an aggregate data size of the first data set and the second data set exceeds a second threshold data size; and 6) performing, by the processor core, an invalid-to-modify (I2M) operation on a memory line in the cache correlating to the first location.

In Example 15, the method of Example 14, further including: 1) receiving, by the processor core, a third request from the application to write a third data set to the cache; 2) determine, by the predictor circuit, that a third location that the third data set is to be written to in the cache is nonconsecutive to the second location; and 3) in response to the third location being nonconsecutive to the second location, performing the RFO operation for the third data set.

In Example 16, the method of any one of Examples 14-15, further including writing the first data set and the second data set to the memory line in the cache.

In Example 17, the method of any one of Examples 14-16, further including storing the first data set and the second data set in the cache using a modified exclusive shared invalid (MESI) protocol to maintain memory coherency between multiple caches.

In Example 18, the method of any one of Examples 14-17, where the first threshold data size is a data size of data fields of two memory lines in the cache.

In Example 19, the method of any one of Examples 14-18, where the data size of the first data set is less than 9 bytes.

In Example 20, the method of any one of Examples 14-19, where the first location and the second location are locations correlating to the memory line in the cache.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computing system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computing systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control, and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, a reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, wherein the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computing systems have been used. For example, the decimal number ten may also be represented as a binary value of 1010 and a hexadecimal letter A. Therefore, a value includes any representation of information capable of being held in a computing system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A multi-core processor comprising:
    a cache to store data;
    a processor core coupled to the cache, the processor core to:
        store a first data set at a first location in the cache; and
        receive a first request from an application to write a second data set to the cache; and
    a predictor circuit coupled to the processor core, the predictor circuit to:
        determine that a second location where the second data set is to be written to in the cache is consecutive to the first location; and
        determine that a data size of the second data set is smaller than a first threshold data size, wherein the processor core is to, in response the data size of the second data set being smaller than the first threshold data size and the second location being consecutive to the first location, delay performing a request-for-ownership (RFO) operation for the second data set,
    wherein the processor core is further to receive a second request from the application to write a third data set to the cache, and
    wherein the predictor circuit is further to:
        determine that a third location where the third data set is to be written to in the cache is consecutive to the second location; and
        determine that an aggregate data size of the second data set and the third data set exceeds a second threshold data size, wherein the processor core is further to perform an invalid-to-modify (I2M) operation on a memory line in the cache correlating to the second location and write the second data set and the third data set to the memory line.

2. The multi-core processor of claim 1, further comprising a buffer to data, wherein the processor core is further to store the second data set and the third data set in the buffer prior to writing the second data set and the third data set to the cache.

3. The multi-core processor of claim 2, wherein the buffer comprises a buffer entry, the buffer entry comprising:
    a plurality of mask bits to indicate the aggregate data size of the second data set and the third data set; and
    an indicator bit to indicate to perform the I2M operation for the second data set and the third data set when the plurality of mask bits indicate the aggregate data size of the second data set and the third data set exceeds the second threshold data size.

4. The multi-core processor of claim 1, wherein the first data set, the second data set, and the third data set are contiguous data sets from the application.

5. The multi-core processor of claim 1, wherein:
    the processor core is further to receive a third request from the application to write a fourth data set to the cache; and
    the predictor circuit is further to determine that a fourth location where the fourth data set is to be written to in the cache is nonconsecutive to the third location, wherein the processor core is further to perform an RFO operation on a second memory line in the cache correlating to the third location and write the third data set to the second memory line.

6. The multi-core processor of claim 1, wherein the predictor circuit comprises:
    a first adder to:
        receive, from the processor core, the data size of the second data set and a first memory address of the first location where the first data set is to be written to in the cache; and
        determine an effective second memory address that is consecutive to the first memory address;
    a first buffer coupled to the first adder, the first buffer to receive and buffer the effective second memory address;
    a comparator coupled to the first buffer, the comparator to:
        receive a second memory address from the processor core; and
        determine whether the second memory address is the same as the effective second memory address;
    a second adder to add the data size of the first data set to the data size of the second data set to obtain an aggregate data size of the first data set and the second data set;
    a multiplexer coupled to a second buffer, the multiplexer to:
        receive the aggregate data size from the second adder, the data size of the second data set from the processor core, and an indicator from the comparator of whether the second memory address is the same as the effective second memory address, and
        send a value correlating to the aggregate data size to the second buffer when the second memory address is the same as the effective second memory address;
    the second buffer to store the value; and
    a threshold comparator coupled to the second buffer, the threshold comparator to:
        determine whether the aggregate data size exceeds the first threshold data size; and
        send, to the processor core, an instruction to perform an invalid-to-modify (I2M) operation when the aggregate data size exceeds the first threshold data size.

7. The multi-core processor of claim 1, wherein the first data set exceeds a second threshold data size, the second threshold data size being a size of 2 memory lines in the cache.

8. A system on a chip (SoC), comprising:
a cache to store data;
a cache controller coupled to the cache, the cache controller to control communications with the cache;
a processor coupled to the cache, wherein the processor is operable to:
store a first data set at a first location in the cache; and
receive a first request from an application to write a second data set to the cache; and
a predictor circuit coupled to the processor, the predictor circuit to determine that a second location where the second data set is to be written to in the cache is nonconsecutive to the first location, wherein the processor is to perform a request-for-ownership (RFO) operation for the second data set and write the second data set to the cache, wherein, to determine that the second location is nonconsecutive to the first location, the predictor circuit is further to:
determine a first effective virtual address (VA) location of the first location;
increment the first effective VA location of the first location by a data size of the second data set to obtain a second effective VA location;
determine a third effective VA location of the second location; and
determine that the third effective VA location is different from the second effective VA location.

9. The SoC of claim 8 wherein the processor is to perform the RFO operation when a load instruction and a store instruction in an instruction set access a same memory location.

10. The SoC of claim 8, wherein the first data set and the second data set are noncontiguous data sets received from the application.

11. The SoC of claim 8, wherein the second location is a memory line in the cache that is set to an invalid state.

12. A method, comprising:
receiving, by a processor core, a first request from an application to write a first data set to a first location in a cache, the first data set exceeding a first threshold data size;
in response to the first data set exceeding the first threshold data size, delaying a request-for-ownership (RFO) operation for the first data set;
receiving, by the processor core, a second request from the application to write a second data set to the cache;
determining, by a predictor circuit, that a second location where the second data set is to be written to in the cache is consecutive to the first location;
determining, by the predictor circuit, that an aggregate data size of the first data set and the second data set exceeds a second threshold data size; and
performing, by the processor core, an invalid-to-modify (I2M) operation on a memory line in the cache correlating to the first location.

13. The method of claim 12, further comprising:
receiving, by the processor core, a third request from the application to write a third data set to the cache;
determining, by the predictor circuit, that a third location that the third data set is to be written to in the cache is nonconsecutive to the second location; and
in response to the third location being nonconsecutive to the second location, performing the RFO operation for the third data set.

14. The method of claim 12, further comprising writing the first data set and the second data set to the memory line in the cache.

15. The method of claim 12, further comprising storing the first data set and the second data set in the cache using a modified exclusive shared invalid (MESI) protocol to maintain memory coherency between a plurality of caches.

16. The method of claim 12, wherein the first threshold data size is a data size of data fields of two memory lines in the cache.

17. The method of claim 12, wherein the data size of the first data set is less than 9 bytes.

18. The method of claim 12, wherein the first location and the second location are locations correlating to the memory line in the cache.

* * * * *